US007992722B2

(12) United States Patent
Thomas

(10) Patent No.: US 7,992,722 B2
(45) Date of Patent: Aug. 9, 2011

(54) RADIAL SEAL FILTER WITH MULTI-COMPONENT HOUSING

(75) Inventor: Chad M. Thomas, Algood, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 829 days.

(21) Appl. No.: 11/343,252

(22) Filed: Jan. 27, 2006

(65) Prior Publication Data
US 2007/0175815 A1  Aug. 2, 2007

(51) Int. Cl.
B01D 35/00 (2006.01)
B01D 35/30 (2006.01)
B01D 27/00 (2006.01)

(52) U.S. Cl. ......... 210/450; 210/451; 210/455; 210/435

(58) Field of Classification Search .................. None
See application file for complete search history.

(56) References Cited

U.S. PATENT DOCUMENTS

| | | | | |
|---|---|---|---|---|
| 3,000,467 A | 9/1961 | Bowers | | 183/2.5 |
| 4,114,906 A | 9/1978 | Jelinek | | 277/166 |
| 5,035,797 A * | 7/1991 | Janik | | 210/232 |
| 5,104,537 A | 4/1992 | Stifelman et al. | | 210/440 |
| 5,259,953 A * | 11/1993 | Baracchi et al. | | 210/232 |
| 5,647,976 A * | 7/1997 | Rothe et al. | | 210/137 |
| 5,753,120 A | 5/1998 | Clausen et al. | | 210/438 |
| 5,770,065 A | 6/1998 | Popoff et al. | | 210/232 |
| 5,817,234 A | 10/1998 | Dye et al. | | |
| 6,015,492 A | 1/2000 | Popoff et al. | | 210/238 |
| 6,146,527 A | 11/2000 | Oelschlaegel | | 210/232 |
| 6,571,962 B2 | 6/2003 | Thomas | | 210/457 |
| 6,595,372 B1 * | 7/2003 | Minowa et al. | | 210/450 |
| 6,615,989 B2 * | 9/2003 | Brown et al. | | 210/443 |
| 6,823,996 B2 | 11/2004 | Durre | | 210/443 |
| 6,922,894 B2 | 8/2005 | Durre | | 29/896.62 |
| 7,318,851 B2 * | 1/2008 | Brown et al. | | 55/498 |
| 2003/0226790 A1 * | 12/2003 | Brown et al. | | 210/90 |

FOREIGN PATENT DOCUMENTS
WO  WO 2007/089662  8/2007
* cited by examiner

Primary Examiner — Benjamin Kurtz
(74) Attorney, Agent, or Firm — Hamre, Schumann, Mueller & Larson, P.C.; J. Bruce Schelkopf

(57) ABSTRACT

A fluid filter housing for receipt of a fluid filter element and for threaded attachment to a mounting base includes a unitary, molded plastic shell, an annular, threaded nutplate, and a plastic weld ring. The plastic shell defines a hollow interior for receipt of the fluid filter element. The plastic shell also defines one side of an O-ring groove. The threaded nutplate includes a groove-side surface that defines a second side of the O-ring groove. The weld ring is securely joined to the threaded nutplate by co-molding and is securely joined to the shell by a spin weld process. The weld ring provides a third surface for the O-ring groove. As such, three separate components are used to create an inwardly opening three-sided annular groove for receipt of an annular seal for sealing an interface between the fluid filter housing and the mounting base.

40 Claims, 7 Drawing Sheets

US 7,992,722 B2

RADIAL SEAL FILTER WITH MULTI-COMPONENT HOUSING

BACKGROUND OF THE INVENTION

The present invention relates in general to fluid filters of the spin-on style that utilize a radial seal for the annular interface between a filter inside diameter and the mounting base (head). More specifically, the present invention relates to the construction techniques utilized to create an inside diameter groove for the annular seal component. The selected and preferred construction technique for the fluid filter housing according to one embodiment uses a combination of three component parts to create the three sides of the annular, inside diameter seal groove. According to another embodiment, the same three component parts are present, but the seal groove is defined by only two of the three component parts. The present invention allows for a seal groove on the inside diameter of a cylindrical form without the need for any special machining and without the need for any complex and/or impractical molding operations.

BRIEF SUMMARY OF THE INVENTION

A fluid filter housing constructed and arranged for receipt of fluid filter media and for attachment to a mounting base according to one embodiment of the present invention comprises a plastic shell including a sidewall defining an open end and a hollow interior for receipt of fluid filter media, the plastic shell further including an annular radial shelf adjacent the open end, an annular, threaded nutplate constructed and arranged for attachment to the mounting base, the threaded nutplate including a groove-side surface, and a plastic weld ring securely joined to the threaded nutplate and to the plastic shell, the plastic weld ring including a radially inward, annular wall. The annular radial shelf, the groove-side surface and the radially inward, annular wall cooperating with each other to define three sides of an annular seal groove that is constructed and arranged to receive an annular seal for sealing an interface between the fluid filter housing and the mounting base.

One object of the present invention is to provide an improved fluid filter housing.

Related objects and advantages of the present invention will be apparent from the following description.

DETAILED DESCRIPTION OF THE INVENTION

Figure 1:
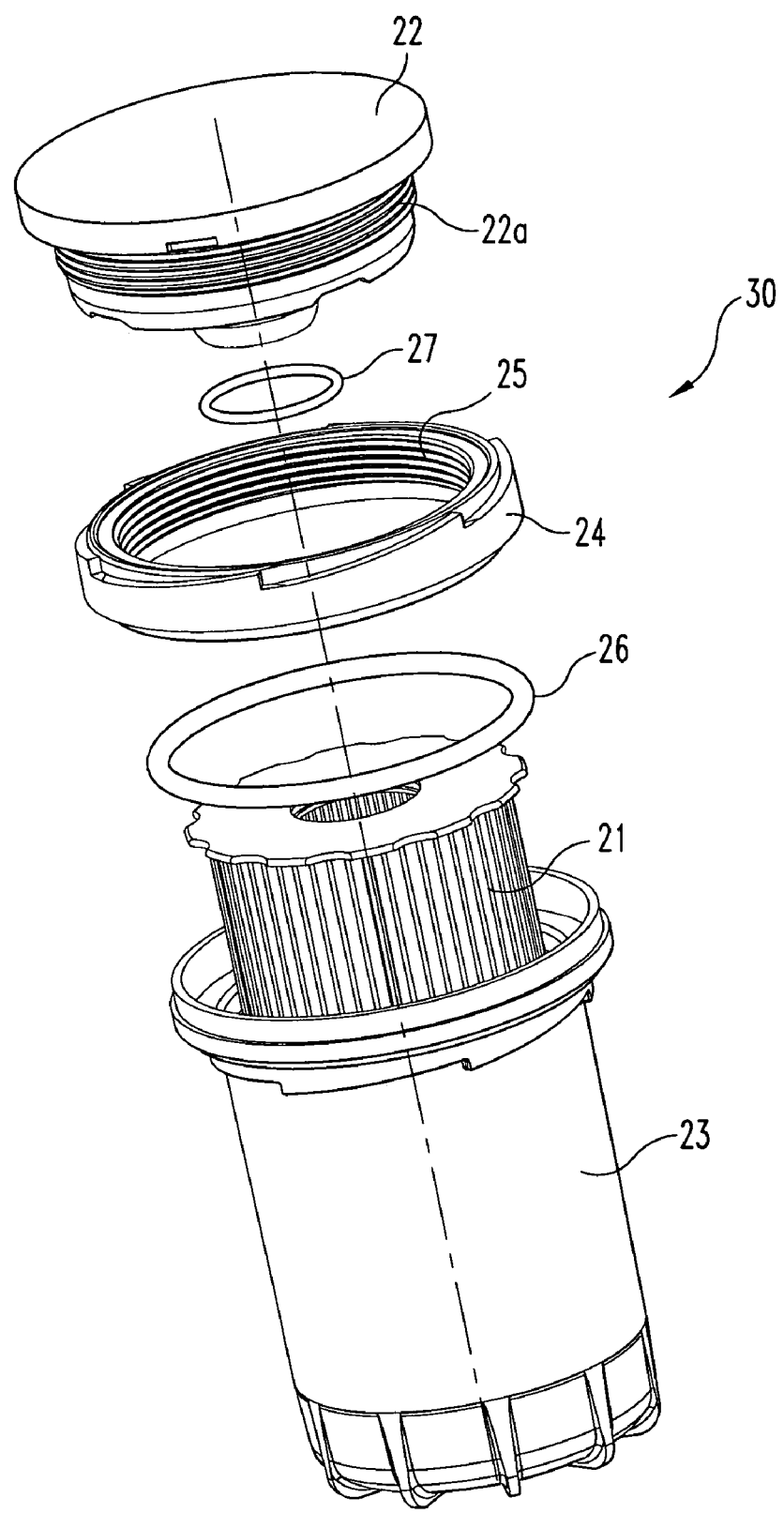
FIG. 1 is an exploded view of a fluid filter assembly incorporating a three-component housing according to a typical embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
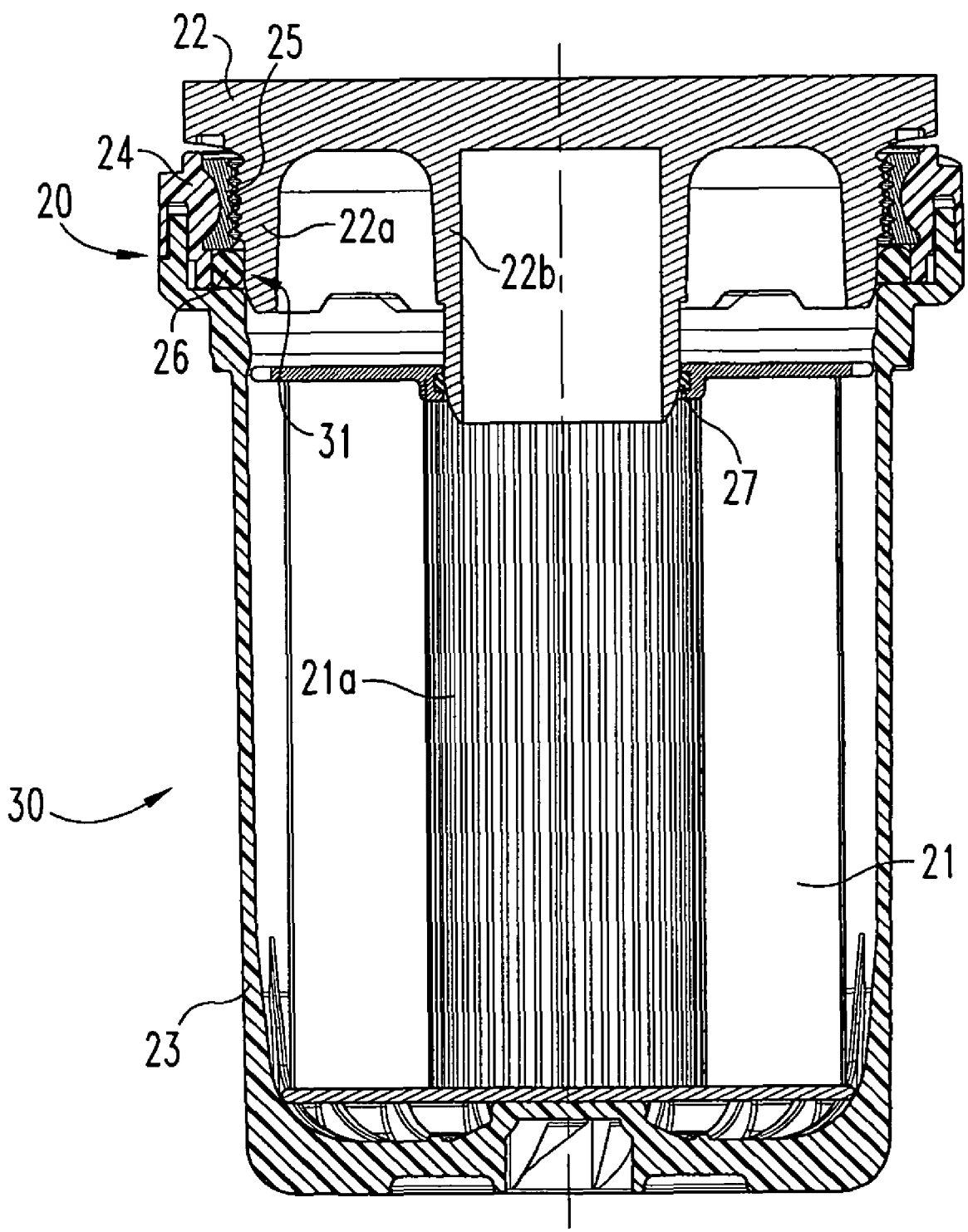
FIG. 2 is a front elevational view, in full section, of the FIG. 1 fluid filter assembly.
Figure 3:
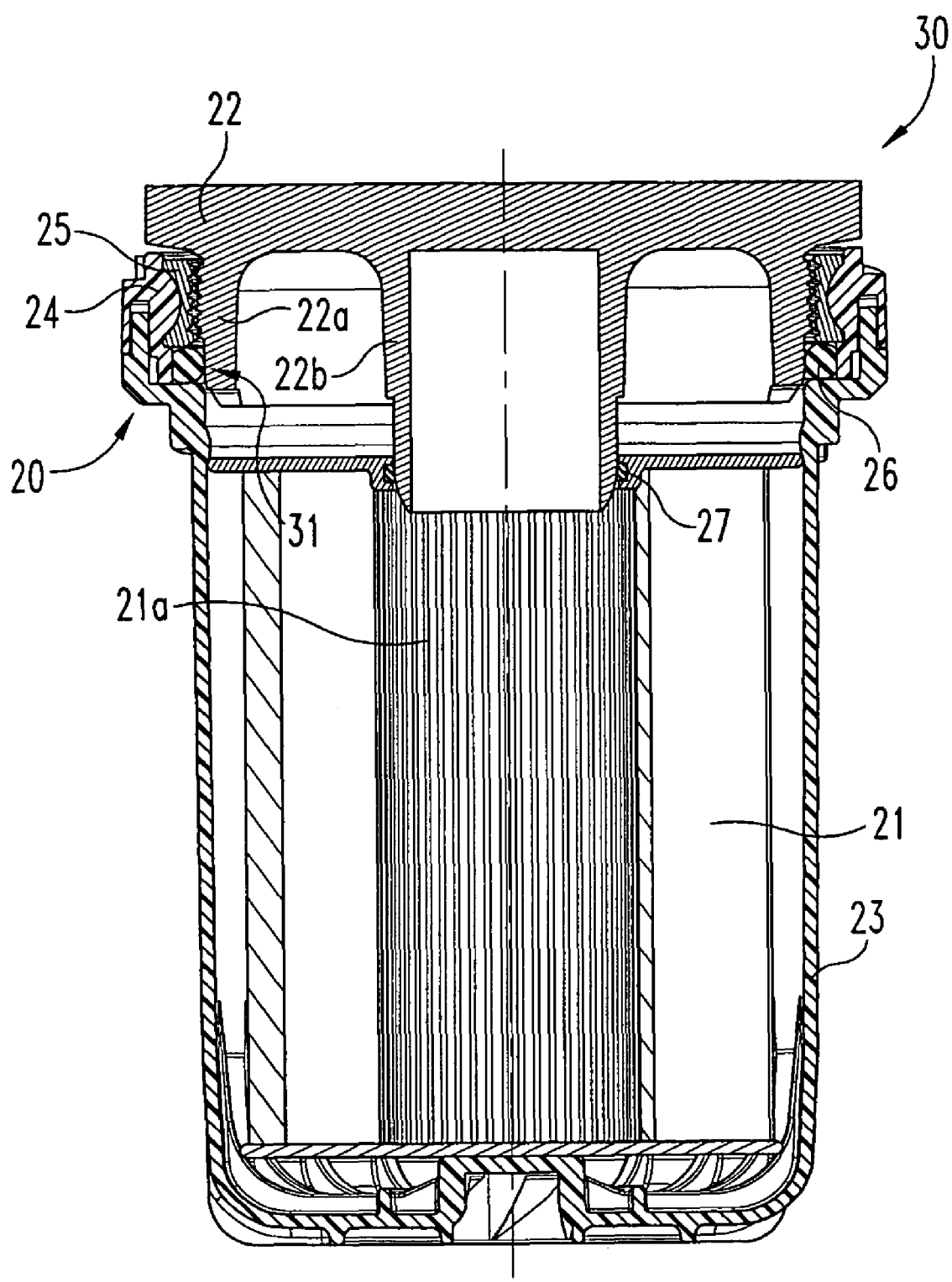
FIG. 3 is a front elevational view, in full section, of the FIG. 1 fluid filer assembly with the cutting plane rotated 45 degrees to the cutting plane of FIG. 2.

Referring to FIGS. 1, 2 and 3, there is illustrated a fluid filter assembly 30 that includes a fluid filter housing 20 as (fully) fabricated according to the present invention. Assembly 30 includes housing 20, fluid filtering media 21, outer O-ring seal 26, and inner O-ring seal 27. The fluid filtering media 21 is constructed and arranged as a snap-in cartridge or element 21. Once the selected fluid filtering element 21 is properly installed into housing 20 and once the desired O-ring seal 26 is installed in a corresponding groove, the completed assembly 30 is ready for a spin-on threaded connection to a mounting base or head 22. The mounting head 22 provides the necessary connections and fluid flow passageways in order to route fluid that is to be filtered into housing 20 and to receive the exiting flow of fluid after is passes through the fluid filtering element 21.

In terms of alternatives and options, when the fluid filtering element 21 is constructed and arranged as a snap-in element, it would typically be part of a completely replaceable design. This allows the shell 23 to be constructed and arranged with a thinner shell wall since the shell will be discarded or disposed of along with the fluid filtering element once the element is loaded with particulate and ready to be discarded and replaced by a new element. Alternatively, the shell 23 can be constructed and arranged with a thicker wall and considered as a permanent shell that is used in combination with a replaceable fluid filtering element cartridge. The style of shell 23 dictates the corresponding style of fluid filter housing 20, either replaceable (i.e., disposable) or permanent.

Figure 7:
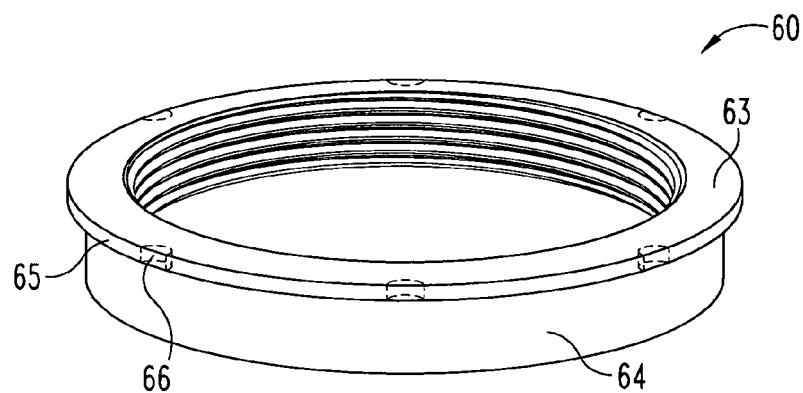
FIG. 7 is a perspective view of an alternative threaded nutplate comprising one component of the FIG. 8 fluid filter housing.
Figure 8:
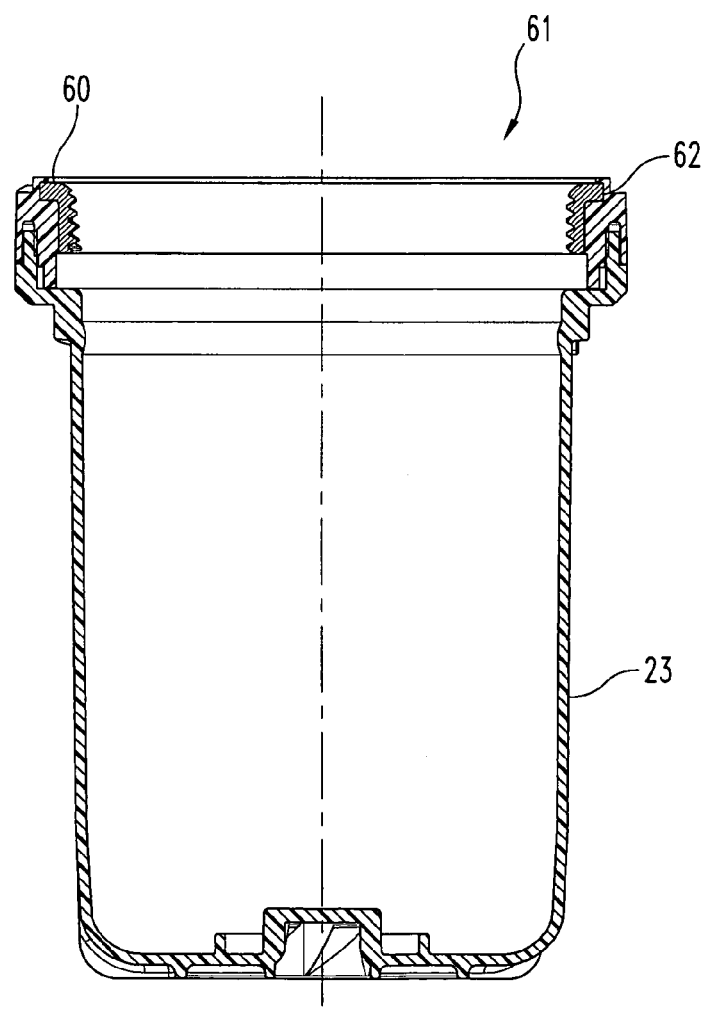
FIG. 8 is a front elevational view, in full section, of an alternative fluid filter housing suitable for use as part of the FIG. 1 fluid filter assembly.

The components that comprise fluid filter housing 20 (see FIGS. 1 and 4) include the unitary, molded plastic shell 23, a unitary, molded plastic weld ring 24, and a unitary, metal, preferably steel, nutplate 25. An alternative nutplate 60 is illustrated in FIG. 7 and its corresponding fluid filter housing 61 is illustrated in FIG. 8. In terms of the completed assembly 30, as illustrated in FIGS. 1, 2 and 3, the fluid filter housing 20 receives the fluid filter element 21 and the O-ring seal 26 and this completed assembly is then ready for threaded attachment to mounting head 22. As described herein, the selected fluid filter media can take on virtually any composition and form so long that it fits within plastic shell 23 and is properly seated and sealed therein for the necessary routing of fluid into fluid filter housing 20, through the fluid filter media, and then back out of fluid filter housing 20. An inner seal 27 may also be applied across the upper circular face of element 21 around the inside diameter of element 21. In the preferred embodiment, inner seal 27 is configured as an O-ring.

The threaded connection of the fluid filter assembly 30 to mounting head 22 is by means of internally-threaded steel nutplate 25 onto the externally-threaded wall 22a of mounting head 22. As this engagement occurs, sleeve 22b inserts into the hollow interior 21a of fluid filter element 21 and this annular interface is sealed by O-ring 27. In order to facilitate a leak-free interface between the housing 20 and mounting head 22 at their threaded interface, it is desired to position an annular gasket or seal on the interior at the base or bottom of that threaded engagement. Preferably, an elastomeric, O-ring seal, such as seal 26, can be used in this location. Alternatively, the selected gasket or seal can be lathe cut or molded. The use of an annular gasket or seal, such as O-ring seal 26, requires an annular groove 31 in order to capture and retain the O-ring seal 26 and position it properly for sealing beneath the threaded interface between the housing 20 and the mounting head 22. The style of required annular groove 31 includes three sides and a fourth "side" that opens inwardly toward mounting head 22 against the lower end of wall 22a.

When an annular groove of the style disclosed herein for O-ring seal 26 is to be fabricated in a single component, a special machining operation (or operations) is necessary. If molding of the annular groove is an option based on material selections, then the required molding operations may be complex or impractical. The creation of an annular O-ring groove on the inside diameter of a cylindrical structure is something that is not considered easy or simple when the groove is defined by a single component part. If the component part is metal, then the groove is most likely created by machining. Even if a cast part, there is mold complexity and likely a post-casting machining operation. When the part is plastic, the groove is most likely created by molding. Since either machining or molding present fabrication process concerns, the present invention is directed to improving the fabrication process and configuration by creating the desired O-ring groove on the inside diameter of a cylindrical form by the cooperation of three separate component parts. Simply assembling these three component parts together creates the three sides required in order to define the annular groove, without any complex machining or molding steps being required. A second embodiment (see FIG. 9) uses the same three components, although two are shaped differently, and the annular groove is created and defined by one of these two parts and the shell. This is achieved by allowing the weld ring plastic to flow around the groove side that is now defined by the nutplate. As such, it is the weld ring 24 (as re-shaped) and shell 23 that define the three sides of the groove. The nutplate is also re-shaped to provide clearance for the weld ring plastic.

Figure 4:
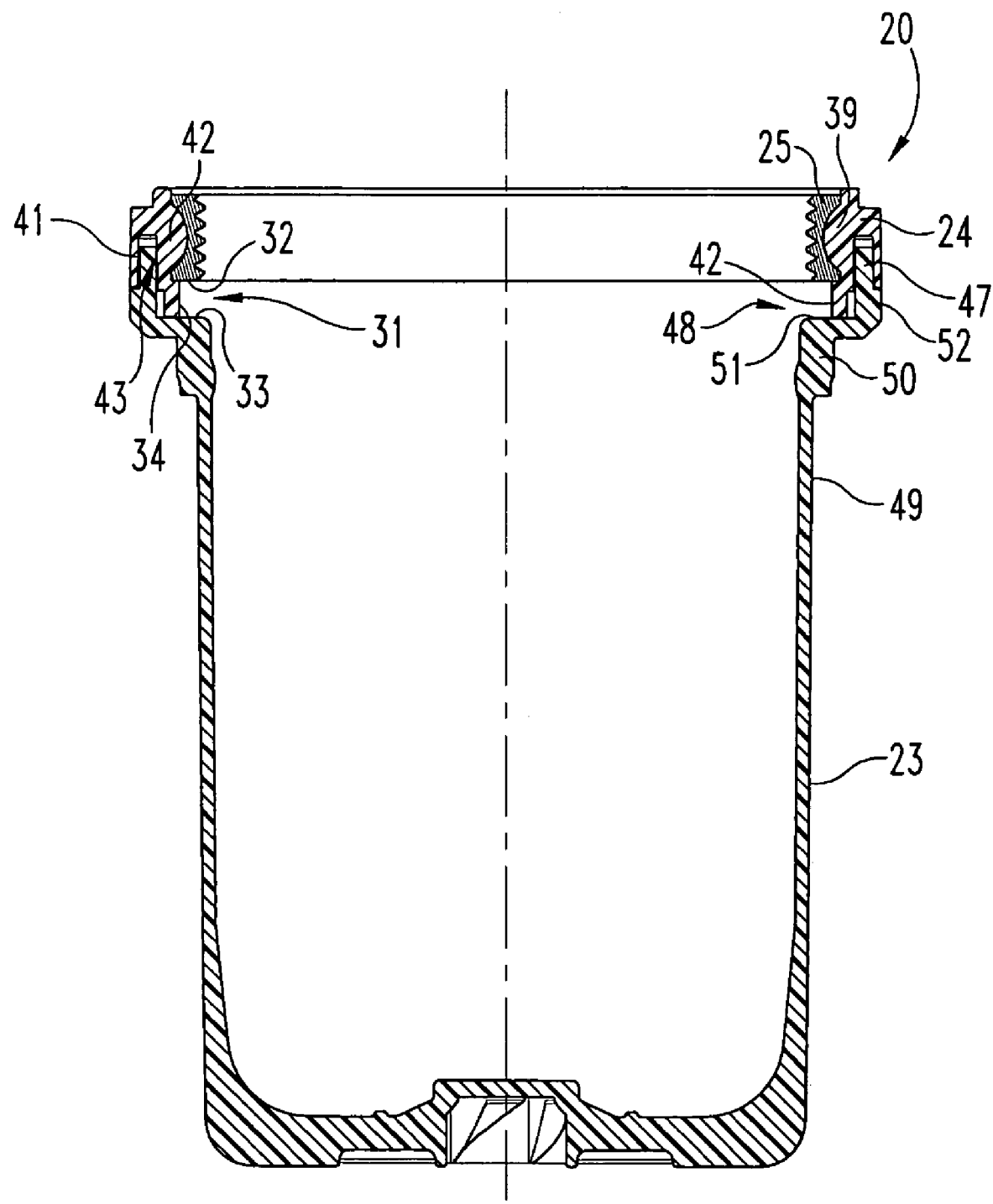
FIG. 4 is a front elevational view, in full section, of the fluid filter housing of the FIG. 1 fluid filter assembly.
Figure 5:
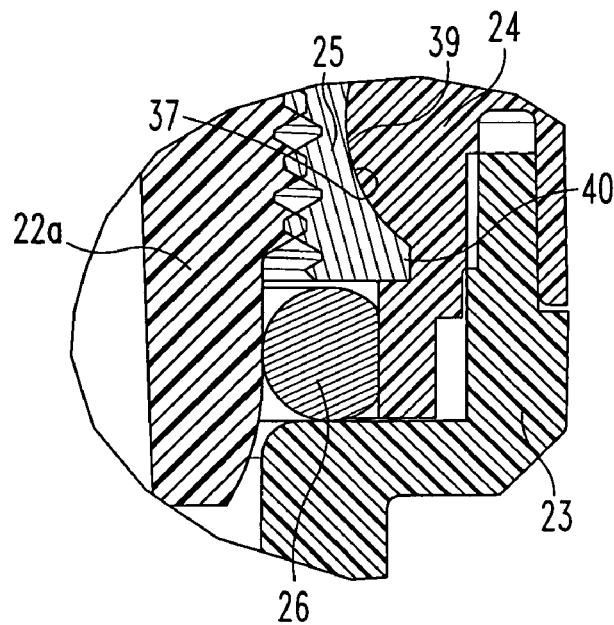
FIG. 5 is a partial, enlarged perspective view of one portion of the FIG. 2 fluid filter assembly.

With reference to FIG. 4, the three component parts that cooperate to define O-ring groove 31 include plastic weld ring 24, steel nutplate 25, and plastic shell 23. Plastic weld ring 24 is a unitary, molded plastic component that is constructed and arranged to securely connect to the shell 23 and to the steel nutplate 25. The steel nutplate 25 is an internally-threaded ring that is constructed and arranged to threadedly attach to the mounting head 22. The plastic shell 23 is an injection molded component part. As illustrated in FIGS. 4 and 5, O-ring groove 31 includes upper and lower sides that are spaced apart and generally parallel to each other and an outside diameter side or surface that defines the base or closed end of the O-ring groove 31. The upper side 32 is created by a lower groove-side surface of the steel nutplate 25. The lower side 33 of the O-ring groove 31 is created by an annular radial shelf portion of shell 23. The outside diameter side or base 34 of groove 31 is created by a radially inward annular wall of weld ring 24.

The use of a metal (steel) nutplate 25 is considered advantageous in terms of its strength, rigidity, dimensional stability at different conditions, and durability over multiple cycles of threading on and threading off mounting head 22 when the housing 20 is constructed and arranged for use with a replaceable fluid filter cartridge. When a plastic shell is used, it is important to establish a strong connection between the nutplate 25 and shell 23 so that there is no relative movement (rotation) between the two as the assembly 30 is tightly threaded onto the mounting head 22.

Plastic weld ring 24 not only provides one side of O-ring groove 31, but also provides the connecting link between the shell 23 and the steel nutplate 25. The connection between steel nutplate 25 and plastic weld ring 24 is achieved by a co-molding process. The same is true for the alternative nutplate 60 and its cooperating and co-molded weld ring 62. The nutplate 25 (see FIG. 6) is positioned within the mold cavity for weld ring 24 and the molten plastic flows in and around nutplate 25 as the shape of weld ring 24 is being created. Since the metal of nutplate 25 and the plastic of weld ring 24 do not bond or fuse together at a molecular level, mechanical configuring is necessary to ensure that these two components will be securely connected together by their mechanical forms without any realistic risk of separating or splitting, thereby functioning as a single, integral unit.

Figure 6:
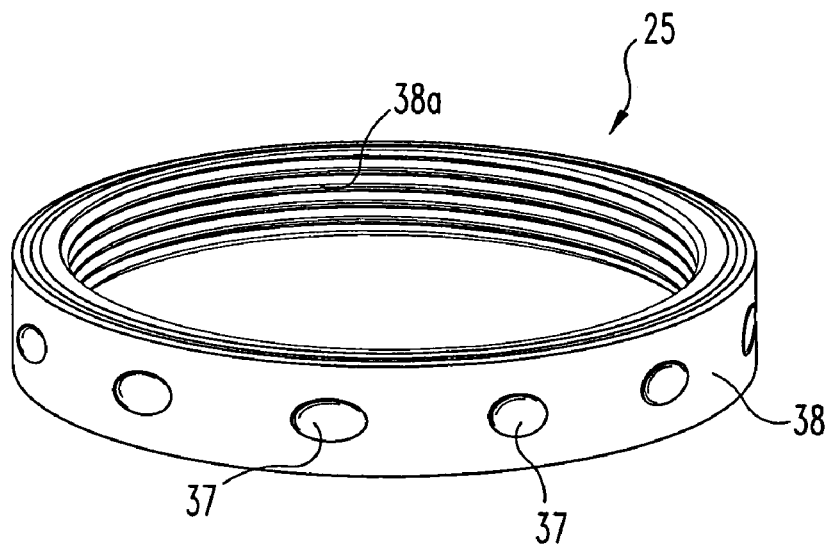
FIG. 6 is a perspective view of a threaded nutplate comprising one component of the FIG. 4 fluid filter housing.

Referring now to FIG. 6, the details of nutplate 25 are illustrated. The referenced mechanical configuring includes a series of spaced-apart oval depressions or detents 37 that are recessed into the outer surface of sidewall 38. This outer surface is radially opposite to and spaced apart from the internal threading 38a. During the co-molding process, molten plastic flows into each detent 37 (see FIG. 5) and the plugs 39 of plastic that solidify in each of the detents 37 then function as a series of locking projections.

As illustrated in FIG. 5, any attempt at axial movement or shift between the weld ring 24 and nutplate 25 is prevented by abutment between the plugs 39 and the edges of the detents 37. Any relative axial movement or shift between these two parts is also prevented by the interlock of lip 40 into the lower portion of weld ring 24 such that plastic flows and solidifies above and below lip 40. The same type of abutment between the plugs 39 and detents 37 occurs with any attempted turning or rotation such as when threading the assembly 30 onto and off of mounting head 22.

With reference to FIGS. 4 and 5, the completed co-molded construction of weld ring 24 and nutplate 25 as a single, integral component, has a resulting shape that provides upper side 32 and base 34 for the desired O-ring groove 31. The weld ring is shaped with an outer annular wall 41, a radially inward, inner annular wall 42 that includes the plastic plugs 39, and an axially, generally cylindrical clearance space or channel 43 positioned between wall 41 and wall 42. This generally cylindrical channel 43 receives a generally cylindrical, axial wall 47 that is molded as part of unitary plastic shell 23.

With the continued reference to FIGS. 4 and 5, and considering the configuration of the upper open end 48 of shell 23, it will be seen that the shell sidewall 49 widens radially into annular portion 50. Portion 50, actually the upper annular radial shelf 51 of portion 50, provides lower side 33 of O-ring groove 31. Portion 50 is in unitary construction with radial shelf 51, annular wall 52, and axial wall 47. The various horizontal and vertical forms and surfaces of open end 48 create not only lower side 33, but an abutment surface (radial shelf 51) for inner wall 42 and an abutment surface (annular wall 52) for outer wall 41. The insertion of axial wall 47 up into clearance 43 has already been described.

The only fabrication step remaining in terms of fluid filter housing 20 is to secure the weld ring 24 to the upper, open end 48 of shell 23. The desired tight, strong, and secure connection is preferably achieved by a spin welding operation that fuses together walls 41 and 42 with axial wall 47. Alternatively, these components could be joined by a vibration weld process or by any other proven attachment technique or process. The dimensionally close mechanical interfit, combined with a spin welding operation, securely connects the weld ring 24-nutplate 25 subassembly to the open end 48 of the plastic shell 23. The result is an integral combination of three separate parts that cooperate to define an outer seal groove (annular) on the inside diameter of a cylindrical form or feature, without the need for any special machining and without the need for any complicated or impractical molding operations. Each of the three components, the weld ring 24, the nutplate 25, and the shell 23 are able to be fabricated using basic or common materials and by practicing basic or common processes or techniques in terms of any machining and/or any plastic molding.

Once the fluid filter housing 20 is fabricated, the fluid filter element or other fluid filter media is installed into the hollow shell interior defined by shell sidewall 49 and the O-ring seal 26 is installed into groove 31. As this fluid filter assembly 30 is threaded onto the mounting head 22, the outer surface 55 radially pushes against O-ring seal 26, putting the elastomeric seal into compression and establishing a liquid-tight annular interface between the fluid filter housing 20 and the mounting head 22.

Referring to FIGS. 7 and 8, the construction and assembly of alternative nutplate 60 is illustrated. Once nutplate 60 and weld ring 62 are securely co-molded together into a single, integral subassembly, their exterior sizes, shapes, and features are virtually identical to the co-molded combination (subassembly) of nutplate 25 and weld ring 24. The only differences between these two subassemblies are found at their interior interface.

Nutplate 60 includes an annular flanged lip 63 that radially extends beyond cylindrical body 64. As the weld ring 62 plastic flows over, around, and below lip 63, see FIG. 8, the weld ring 62 securely captures the nutplate 60 against any type of relative axial movement between these two co-molded parts. In order to prevent any relative rotation or turning motion between these two co-molded parts (nutplate 60 and weld ring 62), some type of edge notch, slot, depression, or indentation can be used on the outer edge 65 of lip 63. Possible indentations 66 are illustrated in broken line form in FIG. 7 as a way to depict that the number, spacing, and shape can vary while still providing a molded-in interlock feature. As would be understood, with edge notches or slots, the overall machining or fabrication process is less complicated than trying to include appropriate indentations in the nutplate body as depicted in FIG. 6. However, edge notches or slots do not provide a suitable structure to prevent relative axial movement. Accordingly, this is where flanged lip 63 becomes important. From the standpoint of fabrication and/or machining, the addition of flanged lip 63 can be provided fairly easily and the notching or slotting of its outer edge 65 can also be provided fairly easily. The combination of lip 63 and appropriate edge indentations 66 prevent any relative motion between the nutplate and weld ring whether talking in terms of relative axial movement or relative rotary or turning movement.

Figure 9:
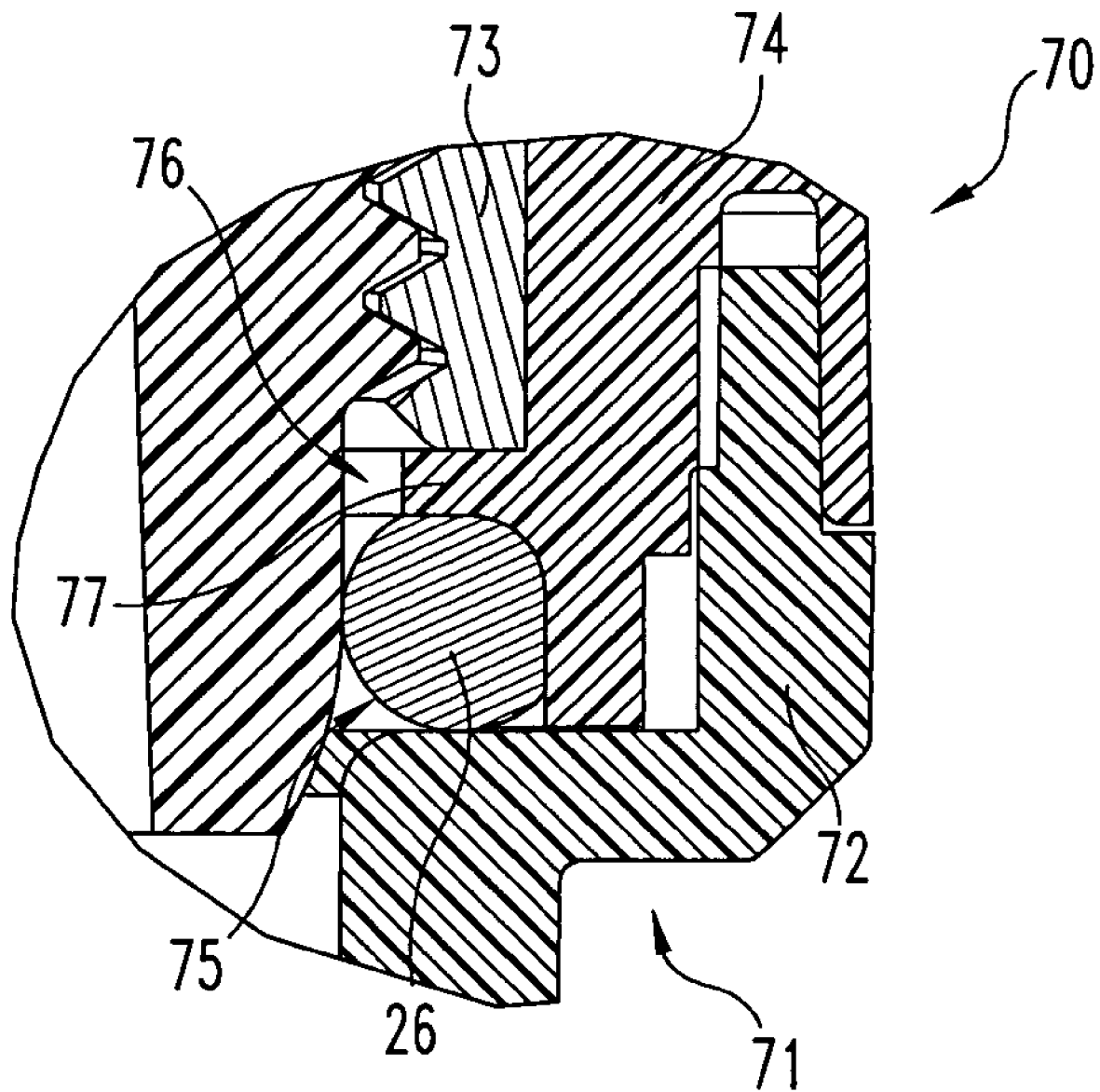
FIG. 9 is a partial, enlarged perspective view of one portion of a fluid filter assembly according to another embodiment of the present invention.

Referring to FIG. 9, a second embodiment of the present invention is illustrated. This fluid filter assembly 70 is only detailed in partial form since it is intended to be virtually identical to fluid filter assembly 30 except for the construction of fluid filter housing 71. As briefly referenced above, housing 71 includes a shell 72, nutplate 73, and weld ring 74. While their part-to-part cooperation and general size and shape are similar to shell 23, nutplate 25 and weld ring 24, only the shell 72 and weld ring 74 define the interior annular groove 75.

The changes reflected by FIG. 9, as compared to FIG. 5, include shortening the axial length of the nutplate 73 so that an annular clearance space 76 is created adjacent the upper face or side of groove 75. When the nutplate 73 is co-molded or insert molded into and as part of the weld ring 74, the weld ring plastic flows into space 76. This creates an annular, radial flange 77 as part of the molded weld ring 74 and this flange 77 provides and defines the third side of groove 75.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A fluid filter housing constructed and arranged for receipt of fluid filter media and attachment to a mounting base, said fluid filter housing comprising:
   a plastic shell including a sidewall defining an open end and a hollow interior for receipt of said fluid filter media, said plastic shell further including an annular radial shelf adjacent said open end;
   an annular, threaded nutplate constructed and arranged for attachment to said mounting base, said threaded nutplate including a groove-side surface and a threaded section having a base end adjacent the groove-side surface;
   a plastic weld ring securely joined to said threaded nutplate and to said plastic shell, said plastic weld ring including a radially inward facing annular wall; and
   said annular radial shelf, said groove-side surface, and said radially inward facing annular wall cooperating to define three sides of an annular seal groove adjacent the base end of the threaded section and that is constructed and arranged to receive an annular seal for sealing an interface between said fluid filter housing and said mounting base.

2. The fluid filter housing of claim 1 wherein said plastic weld ring is co-molded with said threaded nutplate.

3. The fluid filter housing of claim 2 wherein said threaded nutplate defines a plurality of detents for mechanically securing said plastic weld ring to said threaded nutplate by way of said co-molding.

4. The fluid filter housing of claim 3 wherein said plastic weld ring further includes a radially outer, annular wall that is radially spaced-apart from said radially inward facing annular wall.

5. The fluid filter housing of claim 4 wherein said plastic shell includes an annular wall that axially extends into an annular space between said radially outer, annular wall and said radially inward facing annular wall.

6. The fluid filter housing of claim 5 wherein the annular wall of said plastic shell is joined to said radially outer, annular wall and to said radially inward facing annular wall.

7. The fluid filter housing of claim 6 wherein said joining is by way of a spin-welding process.

8. The fluid filter housing of claim 7 wherein said threaded nutplate is internally threaded and said plurality of detents is formed in a surface that is radially opposed to said internally threaded location.

9. The fluid filter housing of claim 8 wherein the mechanical securing of said plastic weld ring to said threaded nutplate includes the molding of plastic into said plurality of detents.

10. The fluid filter housing of claim 1 wherein said threaded nutplate defines a plurality of detents for mechanically securing said plastic weld ring to said threaded nutplate by way of co-molding.

11. The fluid filter housing of claim 10 wherein the mechanical securing of said plastic weld ring to said threaded nutplate includes the molding of plastic into said plurality of detents.

12. The fluid filter housing of claim 1 wherein said plastic weld ring further includes a radially outer, annular wall that is radially spaced-apart from said radially inward facing annular wall.

13. The fluid filter housing of claim 12 wherein said plastic shell includes an annular wall that axially extends into an annular space between said radially outer, annular wall and said radially inward facing annular wall.

14. The fluid filter housing of claim 13 wherein the annular wall of said plastic shell is joined to said radially outer, annular wall and to said radially inward facing annular wall.

15. The fluid filter housing of claim 14 wherein said joining is by way of a spin-welding process.

16. The fluid filter housing of claim 1 wherein said annular seal groove defines an opening that faces said mounting base, and the three sides of said annular seal groove including an upper side, a lower side, and a base.

17. The fluid filter housing of claim 16 wherein said groove-side surface provides said upper side, said annular radial shelf provides said lower side, and said radially inward facing annular wall provides said base.

18. A three-component assembly for creating an annular seal groove defined by three sides and opening radially inwardly, said three-component assembly comprising:
   a first component having a first surface that is constructed and arranged to provide an upper side of said annular seal groove, the first component includes a threaded section having a base end;
   a second component having a second surface that is constructed and arranged to provide a base of said annular seal groove, said second component being securely joined to said first component; and
   a third component having a third surface that is constructed and arranged to provide a lower side of said annular groove, said third component being securely joined to said second component,
   the first surface, the second surface and the third surface together define the annular seal groove adjacent the base end of the threaded section.

19. The three-component assembly of claim 18 wherein said first component and said second component are securely joined together by co-molding.

20. The three-component assembly of claim 19 wherein said first component is metal and formed with a plurality of detents and said second component is plastic and co-molded with said first component with plastic forms of said second component being positioned in said plurality of detents.

21. The three-component assembly of claim 18 wherein said second component and said third component are securely joined together by spin welding.

22. A fluid filter assembly for spin-on attachment to a mounting base, said fluid filter assembly comprising:
   fluid filter media having a central axis;
   a plastic shell including a sidewall defining an open end and a hollow interior for receipt of said fluid filter media, said plastic shell further including an annular radial shelf adjacent said open end;
   an annular, threaded nutplate constructed and arranged for attachment to said mounting base, said threaded nutplate including a groove facing surface that faces and is generally parallel to the annular radial shelf;
   a plastic weld ring securely joined to said threaded nutplate and to said plastic shell, said plastic weld ring including a radially inward facing annular wall that faces radially inward toward the central axis and is generally perpendicular to the groove facing surface, and the radially inward facing annular wall adjoins the annular radial shelf;
   an annular, elastomeric seal; and
   an annular seal groove defined by at least the annular radial shelf and the radially inward facing annular wall, the annular seal groove being open in a direction toward the central axis.

23. The fluid filter assembly of claim 22 wherein said plastic weld ring is co-molded with said threaded nutplate.

24. The fluid filter assembly of claim 23 wherein said threaded nutplate defines a plurality of detents for mechanically securing said plastic weld ring to said threaded nutplate by way of said co-molding.

25. The fluid filter assembly of claim 24 wherein said plastic weld ring further includes a radially outer, annular wall that is radially spaced-apart from said radially inward facing annular wall.

26. The fluid filter assembly of claim 25 wherein said plastic shell includes an annular wall that axially extends into an annular space between said radially outer, annular wall and said radially inward facing annular wall.

27. The fluid filter assembly of claim 26 wherein the annular wall of said plastic shell is joined to said radially outer, annular wall and to said radially inward facing annular wall.

28. The fluid filter assembly of claim 27 wherein said joining is by way of a spin-welding process.

29. The fluid filter assembly of claim 28 wherein said threaded nutplate is internally threaded and said plurality of detents is formed in a surface that is radially opposed to said internally threaded location.

30. The fluid filter assembly of claim 29 wherein the mechanical securing of said plastic weld ring to said threaded nutplate includes the molding of plastic into said plurality of detents.

31. The fluid filter of claim 22 wherein said threaded nutplate defines a plurality of detents for mechanically securing said plastic weld ring to said threaded nutplate by way of said co-molding.

32. The fluid filter of claim 22 wherein said plastic weld ring further includes a radially outer, annular wall that is radially spaced-apart from said radially inward facing annular wall.

33. The fluid filter of claim 32 wherein said plastic shell includes an annular wall that axially extends into an annular space between said radially outer, annular wall and said radially inward facing annular wall.

34. The fluid filter of claim 33 wherein the annular wall of said plastic shell is joined to said radially outer, annular wall and to said radially inward facing annular wall.

35. The fluid filter of claim 34 wherein said joining is by way of a spin-welding process.

36. A fluid filter housing constructed and arranged for receipt of fluid filter media and attachment to a mounting base, said fluid filter housing comprising:
   a plastic shell including a sidewall defining an open end and a hollow interior for receipt of said fluid filter media, said plastic shell further including an annular radial shelf adjacent said open end;
   an annular, threaded nutplate constructed and arranged for attachment to said mounting base, the threaded nutplate including a groove facing surface that faces and is generally parallel to the annular radial shelf;

a plastic weld ring securely joined to said threaded nutplate and to said plastic shell, said plastic weld ring including a radially inward facing annular wall and a flange with a groove-side surface that faces and is generally parallel to the annular radial shelf, the radially inward facing annular wall adjoins the annular radial shelf; and said annular radial shelf, said groove-side surface, and said radially inward facing annular wall cooperating to define three sides of an annular seal groove that is constructed and arranged to receive an annular seal for sealing an interface between said fluid filter housing and said mounting base.

37. The fluid filter of claim 22 wherein the annular seal groove is defined by the annular radial shelf, the groove facing surface, and the radially inward facing annular wall.

38. The fluid filter of claim 22 wherein the plastic weld ring includes a flange, the annular seal groove is defined by the annular radial shelf, the radially inward facing annular wall, and the flange, and the flange is disposed between the annular seal groove and the groove facing surface.

39. The fluid filter housing of claim 1 wherein the shell has a central axis, and the annular seal groove is radially open in a direction toward the central axis to enable the annular seal, when installed in the annular seal groove, to form a radial seal.

40. The three-component assembly of claim 18 wherein the annular seal groove opens radially inwardly to enable a seal, when installed in the annular seal groove, to form a radial seal.

* * * * *